United States Patent [19]

Tibbetts et al.

[11] Patent Number: 5,024,818

[45] Date of Patent: Jun. 18, 1991

[54] APPARATUS FOR FORMING CARBON FIBERS

[75] Inventors: Gary G. Tibbetts, Birmingham; Daniel W. Gorkiewicz, Washington; Dean C. Hammond, Jr., Birmingham, all of Mich.

[73] Assignee: General Motors Corporation, Detroit, Mich.

[21] Appl. No.: 594,540

[22] Filed: Oct. 9, 1990

[51] Int. Cl.$^5$ .............................................. B01J 19/24
[52] U.S. Cl. ..................................... 422/158; 422/150; 423/447.3
[58] Field of Search .................. 423/447.3, 453, 408; 422/150, 158, 199, 202, 204

[56] References Cited

U.S. PATENT DOCUMENTS

| | | | |
|---|---|---|---|
| 1,823,503 | 9/1931 | Mittasch | 422/199 |
| 3,183,277 | 5/1965 | Scherer et al. | 422/202 |
| 3,375,308 | 3/1968 | Turkat | 264/29 |
| 3,411,949 | 11/1968 | Hough | 422/199 |
| 3,664,813 | 5/1972 | Hollander, Jr. | 23/209.1 |
| 4,336,229 | 6/1982 | Wunderlich et al. | 422/204 |
| 4,391,787 | 7/1983 | Tibbetts | 423/447.3 |
| 4,491,569 | 1/1985 | Tibbetts | 423/447.3 |
| 4,565,684 | 1/1986 | Tibbetts et al. | 423/447.3 |
| 4,572,281 | 2/1986 | Arakawa | 264/29.2 |
| 4,749,557 | 6/1988 | Yetler et al. | 423/447.3 |
| 4,816,289 | 3/1989 | Komatsu et al. | 423/447.3 |
| 4,876,078 | 10/1989 | Arkawa | 423/447.3 |

FOREIGN PATENT DOCUMENTS 61-04937 8/1986 Int'l Pat. Institute .
58-1982 10/1983 Japan .

OTHER PUBLICATIONS

Tibbetts et al, "High Temperature Limit . . . Catalytic Iron Particles", Mat Res Symp Proc III, (1988), pp. 49–52.
Tibbetts et al, "An Adsorption–Diffusion . . . Iron Catalytic Particles", Carbon vol. 25 #3, (1987), pp. 367–375.
Tibbetts et al, "Mechanical Propertires . . . Carbon Fibers", J. Phys D: Appl Phys 20, (1987), pp. 292–297.
Hatano et al, "Graphite Whiskers . . . Composites", Proc 30th Nat'l SAMPE Symp, Anaheim, Calif., 1985, pp. 1467–1477.
Endo et al, "Vapor Growth . . . Catalytic Particles", Extended Abst, 17th Bi-Ann Conf on Carbon, 1985, Lexington, Ky., pp 295–296.
Okada et al, "Influence of Gas". . . Carbon Fiber, Extended Abstracts, 19th Bi-Ann Conf on Carbon, Univ Pk, Pa., 1989, pp. 422–423.
Katsuka et al, "Formation of . . . Sulfur-Containing Substrates", Carbon, vol. 19, (1981), pp. 148–150.

Primary Examiner—Peter Kratz
Attorney, Agent, or Firm—George A. Grove

[57] ABSTRACT

In a preferred embodiment, an apparatus for forming carbon fibers in a continuous gas phase reaction is disclosed wherein a reactor defines a vertical reaction chamber with a close upper end and a lower outlet, with a vertical reactant feed tube which extends generally axially therewithin. Gaseous reactants are injected into the reactor through an opening of the feed tube. The feed tube and chamber are constructed and arranged to define a gas flow path which extends generally axially upward through the feed tube into the chamber and thereafter generally axially downward through the chamber. Preferably, the tube and reactor chamber are radially spaced and concentric. The feed tube may encompasss a capillary tube which supplies a vaporizable liquid reactant. The reactor and feed tube are each elongate and of a material which is relatively resistent to heat and corrosion and are preferably of a mullite material. The feed tube extends more than one-half of the axial length of the reactor. Desirably, the feed tube extends at least three-fourths of the axial length of the reactor, and preferably extends at least five-sixths of the length thereof and is concentric with the reactor chamber defined by the tubular reactor.

9 Claims, 1 Drawing Sheet

APPARATUS FOR FORMING CARBON FIBERS

BACKGROUND OF THE INVENTION

This invention relates to forming carbon fibers. More particularly, this invention relates to an apparatus for making carbon fibers in a continuous gas phase reaction, which provides desired conditions for each step of the reaction including decomposition of a compound containing nuclei, formation of nuclei, decomposition of a carbonaceous compound and reaction of the decomposed carbonaceous compound with the nuclei, thereby forming carbon fibers.

Carbon fibers are used to make composite materials. Such carbon composites provide the advantages of relatively high strength and low weight as compared to other materials commonly used to form articles such as automotive, boat, airplane and other parts. High strength and low weight are key advantages needed to reduce vehicle fuel consumption and increase fuel economy. The strength of the composite is directly related to the quality of the carbon fibers. Preferred fibers have basal planes arranged in concentric circles and are of microscopic size for improved strength to weight ratio. Such microscopic fibers effectively achieve the advantages of improved strength, low weight and, therefore, improved fuel economy.

Prior methods of forming fibers basically consist of conducting a gas phase batch reaction in a vessel. Specifically, such methods include dispensing iron particles, in the form of a powder or in a solution, into a vessel while simultaneously dispensing a liquid or gas hydrocarbon compound, then decomposing the hydrocarbon compound to form carbon-containing compounds which react with the iron particles. A diluent gas, such as hydrogen, is injected into the vessel to control the rate at which decomposition and growth proceed. The vessel is typically arranged so that convective currents are generated. These currents often cause a loss of heat which reduces the temperature of the reactants to below that desired for optimum fiber formation. The currents also cause losses of feedstock reactant material, including expensive catalyst material, due to thermophoretic deposition on the walls. Typically, the batch reaction has proceeded in the vessel for a period of time, fibers are collected, and then the reaction is started again. Typically, large fibers, that is fibers having dimensions greater than the desired microscopic fibers, are produced along with undesirable soot. Often a mixture of soot and large fibers results when prior processes and vessels are used. This may occur because it is difficult to control the conditions at which the various steps of the reaction occur in conventional batch processes, particularly when convective currents arise in conventional vessels.

Prior methods and vessels typically include a preconditioning period. The vessel is preheated and/or the surface thereof is prepared using iron particles before the reaction is initiated. The prepreparation effort is typically extensive in relation to the reaction period during which the product is actually produced. Such methods are not cost effective for use in commercial scale plants.

Therefore, it is an object of this invention to provide a continuous process and apparatus for forming carbon fibers in a gas phase reaction; to improve the process of forming carbon fibers by providing an apparatus constructed and arranged to achieve optimum conditions for forming microscopic carbon fibers in a gas phase reaction; to maintain essentially steady state, controlled reaction conditions in a continuous flow process in which microscopic carbon fibers are formed; to minimize convective currents; and to minimize thermophoretic losses of feedstock reactant material. It is also an object to provide a method and apparatus which produces an increased yield of carbon fibers, provides a larger proportion of smaller fibers, substantially eliminates soot, and decreases the cost of producing carbon fibers.

SUMMARY OF THE INVENTION

In the preferred embodiment, these and other objects are accomplished by providing an apparatus for forming carbon fibers in a continuous gas phase process by reacting a carbonaceous compound in the presence of nuclei entrained in a gas stream. Each of the nuclei forms a center about which a carbon fiber grows. The apparatus comprises a reactor and reactant feed tube constructed to provide a continuous gas flow path with an upwardly flow portion and a downwardly flow portion arranged in heat transfer relationship to one another. The reactor defines a vertical reaction chamber with a closed upper end and a lower outlet. The reactant feed tube is disposed in the reactor and extends generally axially upward therein. Gaseous reactants are injected into the reactor through an opening of the feed tube. The feed tube and chamber are constructed and arranged to define a gas flow path which extends generally axially upward through the feed tube into the chamber and thereafter generally axially downward through the chamber. Preferably, the tube and reactor chamber are radially spaced and concentric. In one embodiment, the feed tube may encompass a capillary tube which supplies a vaporizable liquid reactant. The reactor and feed tube are each elongate and of a material which is relatively resistent to heat and corrosion and are preferably of a mullite material. The feed tube extends more than one-half of the axial length of the reactor. Desirably, the feed tube extends at least three-fourths of the axial length of the reactor, and preferably extends at least five-sixths of the length thereof.

In order to supply the necessary heat for the reaction, the apparatus has means for heating the reactor to establish a hot zone for thermal decomposition or pyrolysis reaction within the chamber adjacent its closed end. A relatively cool zone is adjacent the reactor outlet. The hot and cool zones are constructed and arranged to establish a thermal gradient within the reactor to minimize convective currents within the reactor. As a result, in the reactor, hot gases are disposed over cold gases. Preferably, the heating means is a furnace which encompasses at least the closed upper end of the reaction chamber and a portion of the chamber adjacent the closed end.

The apparatus also has means for continuously supplying a gaseous reactant stream into the feed tube at a rate sufficient to entrain the nuclei within the gas stream, to minimize thermophoretic deposition, and disperse the nuclei into the reactor hot zone. The gaseous reactant stream may include a vaporizable constituent.

To facilitate fiber growth, the reactor chamber has an average cross sectional area substantially greater than the average cross sectional area of the feed tube. In this arrangement, gas moves upwardly through the feed tube quickly, minimizing reactant deposition and other losses, and into the hot zone at a velocity sufficient to entrain nuclei and disperse and scatter the nuclei in the reaction chamber. However, the flow must not be so rapid as to cool the reaction zone. Since the reactor chamber has a much greater average cross sectional area, it accommodates the gas stream at a reduced downward flow rate suitable for sustained fiber growth. Preferably, the reactor chamber is tubular and substantially concentric with the feed tube along the axial extent thereof. Desirably, the reaction chamber has a diameter which is at least three times greater than the diameter of the feed tube, and preferably five times greater.

It will be appreciated by those skilled in the art that the average mass flow rate of the upwardly moving stream and the downwardly moving stream are essentially the same as there is no noticeable accumulation within the reaction chamber. Due to the expansion of the stream, the downwardly flowing stream will have a reduced flow rate, that is, a reduced average velocity in accordance with the greater cross sectional area available in the reactor chamber as compared to the feed tube.

The apparatus includes means for collecting carbon fibers from the exhaust gas which exits the reactor outlet.

In use, preferably a pressurized stream comprising a gaseous carbonaceous compound is supplied to the inlet of the feed tube. A compound which forms nuclei is injected into the gas stream. The pressurized stream and injected compound flow upward in the feed tube, are heated from an ambient inlet temperature to an elevated temperature, and are discharged at the opening into the hot zone of the reactor chamber. The stream flows at a reduced flow rate down through the relatively large reaction chamber wherein the nuclei each form lengthening filament from carbonaceous compounds produced by the decomposition of the carbonaceous compound reactants in the feedstock. The gaseous stream in which the fibers are entrained then exits the reactor at the outlet. Thereafter, the fibers are separated from the stream, preferably by cyclone separators.

Preferably, in use, the hot zone is at a temperature sufficient to at least initiate formation of catalyst particles or nuclei in the 5 nm in diameter range, while in the feed tube. At the same time, the temperature of the hot zone is controlled so that complete pyrolysis of reactants in the feed tube does not occur, as this may lead to sooting, with undesired deposition of material, rather than the formation of microscopic carbon fibers.

Fibers formed in the apparatus of the invention have basal planes arranged in concentric circles and are microscopic in size. The fibers are in the range of 20 to 100 nanometers in diameter (microscopic) and have a length of at least several micrometers. The fibers pack so loosely in a fibrous matrix that their apparent bulk density is in the range of 0.001 to slightly over 0.02 grams per cubic centimeter and preferably have a density below 0.01 grams per cubic centimeter. Thus, the invention provides a continuous process and apparatus for forming carbon fibers in a gas phase reaction, improves the process of forming microscopic carbon fibers, permits the continuous formation of fibers in a continuous reaction while maintaining an essentially steady state, controls desired reaction conditions, minimizes undesirable convective currents, increases the yield of carbon fibers, minimizes thermophoretic wastage of feedstock, substantially eliminates soot, increases the proportion of smaller, microscopic fibers, and decreases the cost of producing fibers.

DETAILED DESCRIPTION OF THE PREFERRED EMBODIMENT

Figures 1, 2:
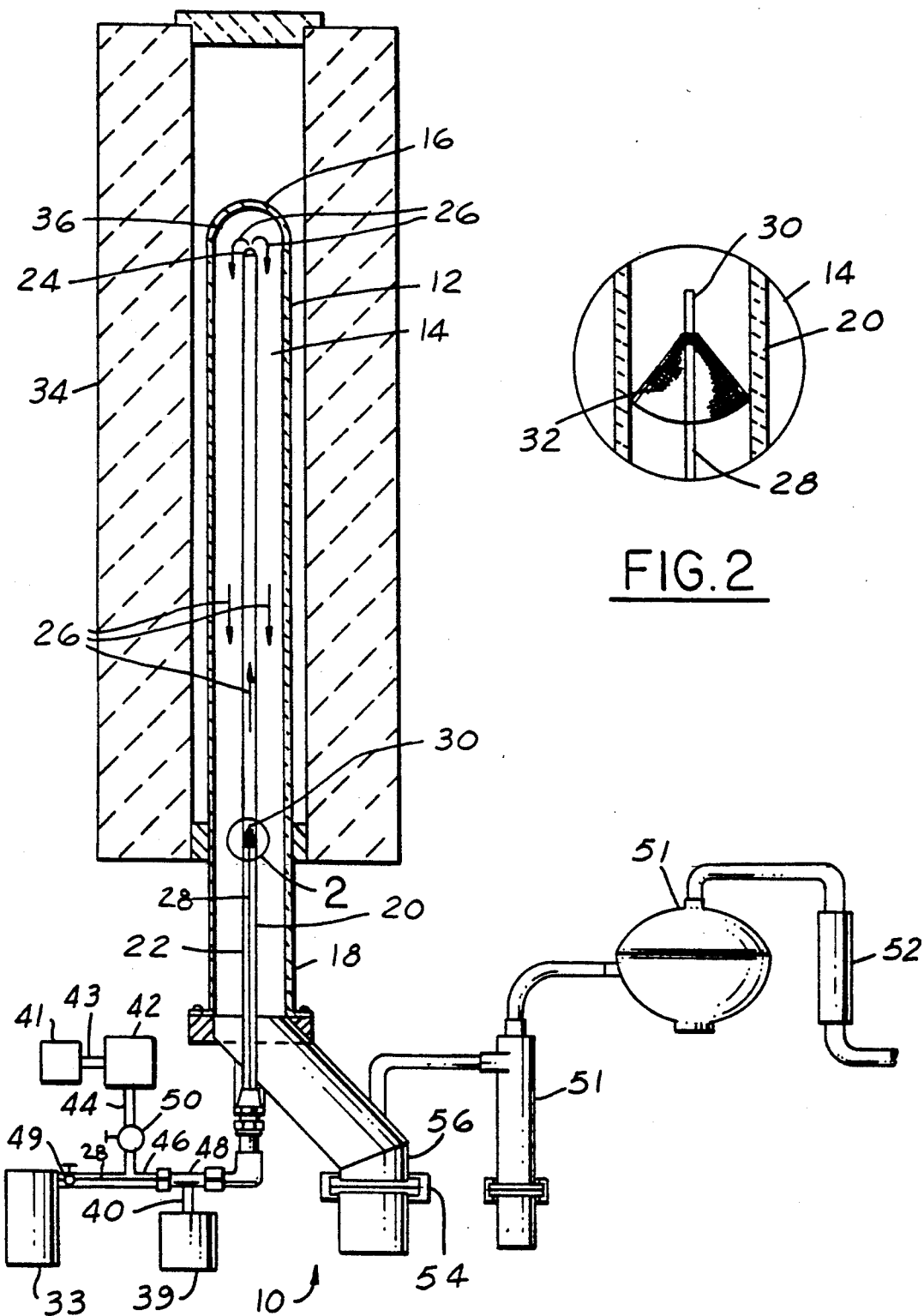
FIG. 1 is a diagrammatic cross sectional view of an apparatus embodying this invention with a reactor defining a vertical reaction chamber and a reactant feed tube extending axially upward therein.
FIG. 2 is a fragmentary exploded view of the encircled portion of FIG. 1.

FIG. 1 illustrates a preferred apparatus 10 for forming carbon fibers by a continuous gas phase process comprising reaction of a gaseous carbonaceous compound in the presence of nuclei entrained in a gas stream. Apparatus 10 includes a reactor 12 defining a chamber 14 with a vertical axis, a closed upper end 16 and a lower outlet 18. Gaseous reactants are injected into the reactor 12 by a reactant feed tube 20 which is disposed in the chamber 14 and extends generally axially upward. The feed tube 20 has an inlet 22 at one end and a discharge opening 24 at the other end spaced from the reactor closed end 16. The opening 24 of the feed tube 20 is adjacent the closed end 16, and the feed tube 20 extends more than one-half of the axial length of the reactor. Desirably, the feed tube extends at least three-fourths of the axial length of the reactor, and preferably five-sixths of the length thereof.

A gas flow path 26 is defined by the gas feed tube 20 and reactor 12. The gas flow path 26 extends generally axially upward through the feed tube 20 into the chamber 14 and thereafter generally axially downward through the chamber 14. Desirably, the reactor 12 defines a tubular, thermal reaction chamber 14 which is substantially concentric with the opening 24. Preferably, the chamber 14 is radially spaced from the feed tube 20 and concentric therewith throughout its entire axial extent. Desirably, the reactor 12 and feed tube 20 are each elongate, that is, each has a length greater than its diameter.

If it is desired to supply a vaporizable liquid reactant, preferably, a capillary tube 28 supplies the vaporizable liquid reactant through a discharge end 30 thereof. Capillary tube 28 is disposed within the feed tube 20 and concentric therewith. In order to provide surface area from which any droplets of vaporizable liquid reactants will vaporize, a web 32 or screen preferably of metal such as stainless steel is disposed around the capillary tube 28 adjacent its discharge end 30 within the feed tube 20 (FIG. 2). Desirably, the liquid includes the nuclei and is supplied to capillary tube 28 from pump 33.

In order to supply the necessary heat for the reaction, the apparatus 10 has heating means such as a heater or furnace 34 to heat the reactor 12 to establish a hot zone 36 within the chamber 14 adjacent the close end 16. The temperature of the hot zone 36 is sufficient to sustain carbon fiber growth. There is a relatively cool zone adjacent the reactor outlet 18. The hot zone 36 adjacent the closed end 16 of the chamber 14 and the cool zone adjacent the reactor outlet 18 establish a thermal gradient within the reactor 12 to minimize convective currents within the reactor. As a result, in the reactor, hot gases are disposed over cold gases.

Preferably, the temperature of the hot zone 36 is sufficient to decompose any of a variety of gaseous carbonaceous compounds which may include, for example, one or more vaporizable hydrocarbons. Thus, the reactor 12 defines a thermal decomposition or pyrolysis chamber 4. Desirably, a first temperature is maintained adjacent the inlet 22, a second temperature greater than the first temperature is maintained within the hot zone 36, and a third temperature less than the second temperature is maintained adjacent the outlet 18. Desirably, the inlet 22 is at an ambient temperature, the hot zone 36 is at a temperature greater than 1000° C. and the outlet 18 is at a temperature between ambient and 1000° C. Preferably, a temperature over 1050° C. is maintained near zone 36.

In order to establish a desired temperature condition, preferably, the furnace 34 is an electric furnace which encompasses at least the closed upper end 16 of the chamber 14 and a portion of the chamber 14 adjacent the closed end 16. The furnace 34 is arranged to transfer heat to the chamber 14 which in turn transfers heat to the feed tube 20.

The reactor 12 and feed tube 20 are each constructed of a material which is relatively resistant to heat and corrosion. Suitable materials include stainless steel, quartz, ceramic, and refractory materials. Desirably, a refractory such as alumina or mullite is used. Preferably, mullite is used, which is a silicate of aluminum. Mullite is more resistant to corrosion than stainless steel and it has better heat transfer properties than quartz. Mullite is better able to withstand the temperature shock that occurs when liquid is injected.

The apparatus 10 comprises means for continuously supplying a gaseous reactant stream into the feed tube 20 at a rate sufficient to entrain the nuclei within the stream and disperse the nuclei into the reactor hot zone 36. Preferably, pressurized or compressed gas is used, supplied from compression and flow control system 39, and then through line 40. Specifically, the gaseous reactant stream must move at a velocity sufficient to entrain the nuclei within the gas stream for dispersion into the reactor hot zone 36. If it is desired to supply nuclei entrained in a gas stream at inlet 22 of feed tube 20 rather than nuclei in a liquid, a pressurized gas is supplied from compression and flow control system 41. The gas is then bubbled through a reservoir 42 which holds nuclei bound in a liquid. Line 43 connects system 41 to reservoir 42. This forms a gas/nuclei mixture which is then supplied from reservoir 42 through line 44 by gas pressure rather than a pump and then through line 46 to tee 48 where it mixes with gas in line 40 before entering feed tube 20 at inlet 22. Valve 49 is closed when nuclei are supplied through line 44 and valve 50 is closed when nuclei are supplied through capillary tube 28. When gaseous reactants are provided through lines 44 and 40 to feed tube 20, apparatus 10 may be operated with valve 49 closed; alternatively, apparatus 10 may be operated without capillary tube 28, web 32 and pump 33.

In order to provide desired conditions for microscopic fiber growth, the reaction chamber 14 has an average cross sectional area substantially greater than the average cross sectional area of the feed tube. Desirably, the reactor chamber 14 has an inside diameter at least three times greater than the diameter of the opening 24, and preferably five times greater. By this arrangement, gas moves quickly through the inlet 22, is warmed in feed tube 20, and then moves into the hot zone 36, where it is dispersed and scattered remote from the surfaces within the hot zone 36. The gas then moves slowly and migrates down through the chamber 14 for an extended time, at a reduced flow rate suitable for sustained fiber growth. Preferably, the velocity of the reactant stream in the feed tube 20 is at least 10 cm/s and this velocity is at least nine times greater than the velocity of the downwardly migrating stream in the chamber 14.

In this arrangement, gases around the feed tube 20 can be thought of as essentially controlling the heat flow from the hot zone 36 to the feed tube 20 to warm the incoming gases without encouraging premature fiber growth.

The reactor 12 includes means for collecting carbon fibers from exhaust gas exiting the outlet 18, which desirably comprises at least one cyclone-type separator 51 and filters 52 for trapping the microscopic carbon fibers. Preferably, a portion of the fibers are first collected in a trap 54 adjacent the outlet 18 at the bottom of an angled exhaust line 56, and then the rest are collected by two cyclones 51 separately in series.

The apparatus 10 of the invention is used to form microscopic carbon fibers in accordance with the following examples which are meant to be illustrative and not limiting.

EXAMPLE 1

The apparatus 10 of the invention was used to form carbon fibers by a continuous gas phase reaction in the presence of nuclei introduced in a gas stream. A pressurized stream comprising a gaseous carbonaceous compound such as methane, ethane, hexane, carbon dioxide, carbon monoxide, ethylene and/or acetylene was supplied to the inlet 22 of the reactant feed tube 20. A compound which forms nuclei was injected into the gas stream. The pressurized stream and injected compound flowed upward in the feed tube 20 were heated from an ambient inlet temperature to an elevated temperature and were discharged at the opening 24 into the hot zone 36 of the reactor chamber 14. The stream flowed at a reduced flow rate down through the relatively large reaction chamber 14 wherein the nuclei grew carbon fibers, formed from gas phase carbonaceous compounds. The gaseous stream in which the fibers were entrained then exited the reactor 12 at the outlet 18. The fibers were then separated from the stream by the trap 54 and cyclone separators 51.

EXAMPLE 2

The apparatus 10 of the invention was used in a process to form carbon fibers in accordance with Example 1 wherein the reactants included a hydrocarbon compound such as methane, ethane, hexane and ethylene and a metal compound which formed metal nuclei. The hydrocarbon compound included a vaporizable solvent in which the metal compound was dissolved. The solution comprising the solvent and the dissolved compound were injected at the inlet 22 and vaporized within the feed tube 20. The metal compound formed submicron metal nuclei and carbon fibers were produced as the hydrocarbon decomposed. That is, the hydrocarbon was dehydrogenated and carbon filaments grew on the metal nuclei, thereby forming carbon fibers. Thermal decomposition was achieved in the reactor 12 by maintaining a temperature in the hot zone 36 in excess of 1000° C.

EXAMPLE 3

The apparatus 10 of the invention was used to form carbon fibers in accordance with Example 2. The apparatus 10 further included a rector 12 of a mullite material defining a 13 centimeter ID reaction chamber 14 and a feed tube 20 of mullite with a 19 mm ID. The closed end 16 of the reactor 12 extended about 102 cm into the furnace 34. The feed tube 20 was extended into the reactor chamber 14, so that the opening 24 of the feed tube 20 was spaced about 7 centimeters from the reactor closed end 16. In this position, the feed tube 20 extended about 94 cm into the chamber 14. The feed tube 20 encompassed a 0.5 mm diameter capillary tube 28 which had a discharge end 30 adjacent the inlet 22 of the feed tube 20, concentric therewith. The capillary tube 28 extended about 3 cm into the furnace 34 and was spaced about 99 cm from the reactor closed end 16. Metal nuclei of iron were formed from an iron compound, ferrocene, which was dissolved in hexane to form a solution. To make the hexane/ferrocene solution, 2.5 g of ferrocene were dissolved in hexane, producing a total volume of 100 cc; this solution was pumped through the capillary tube 28 and into the feed tube 20. In order to provide warm surface area from which any droplets of liquid solution would vaporize, a stainless steel web 32 was placed around the capillary tube 28 adjacent its discharge end 30 and disposed between the capillary tube 28 and the feed tube 20. Any droplets of liquid which wet the web 32 were vaporized.

The gaseous stream was injected into the feed tube 20 at a pressure of about 760 Torr. The flow rates of the reactants were measured at 22° C. and 760 Torr pressure. The gaseous flow rates for the various constituents were approximately as follows: hydrogen at 5000 cc/min, air at 1365 cc/min, methane at 1500 cc/min, hydrogen sulfide at 110 cc/min. The hexane/ferrocene liquid was injected at about 4 cc/min. The process provided microscopic carbon fibers having a density of about 0.005 grams per cubic centimeter. A yield of approximately 12 percent was achieved.

EXAMPLE 4

The apparatus 10 of the invention in accordance with Example 3 was used in a process as described therein except that the initial flow rates were approximately as follows: hexane/ferrocene at 4.5 cc/min; air at 2000 cc/min; methane at 2500 cc/min; hydrogen sulfide at 9 cc/min.

The total flow rate was varied while maintaining the proportionality of the reactants described immediately above. Microscopic carbon fibers were formed having a diameter in the range of 50 to 100 nanometers and a length of several micrometers with a density in the range of 0.002 to 0.014 grams per cubic centimeter. At a total flow rate of 10,000 cc/min, a yield of 36 percent was obtained, and the fibers had a density of about 0.009 grams per cubic centimeter, at a total flow rate of 1,800 cc/min a yield of 19 percent was obtained and the fibers had a density of about 0.002 grams per cubic centimeter.

EXAMPLE 5

The method of Example 4 was used except that the internal diameter of the feed tube 20 was 8 mm and it was constructed of a (quartz) silica material. As in Example 4, the total flow rate was varied while maintaining the proportionality of the reactants as described in Example 4. Microscopic carbon fibers were formed having a diameter in the range of 50 to 100 nanometers and a length of several micrometers with a density in the range of 0.002 to slightly over 0.02 grams per cubic centimeter. At a total flow rate of 5,000 cc/min, a yield of 36 percent was obtained, and the fibers had a density of 0.004 grams per cubic centimeter.

EXAMPLE 6

The method of Example 4 was used except that the internal diameter of the feed tube 20 was 22 mm and it was constructed of 304 stainless steel. As in Example 4, the total flow rate was varied while maintaining the proportionality of the reactants described in Example 4. Microscopic carbon fibers were formed having a diameter in the range of 50 to 100 nanometers and a length of several micrometers with a density in the range of 0.002 to slightly over 0.02 grams per cubic centimeter. At a total flow rate of 7,000 cc/min, a yield of 28 percent was obtained, and the fibers had a density of 0.002 grams per cubic centimeter.

EXAMPLE 7

The apparatus 10 of the invention was used in a process to form carbon fibers in accordance with Example 1 wherein the reactants included a gaseous hydrocarbon compound such as methane and ethane and a metal compound which formed metal nuclei. The gaseous hydrocarbon compound stream was supplied from controller 39 through line 40. Helium gas at a flow rate of 72 cc/min was bubbled through reservoir 42, which was a standard laboratory bubbler containing 250 cc of liquid iron carbonyl. Because of its vapor pressure (24 Torr at 20° C.), appreciable iron carbonyl vapor was mixed with the flowing helium. The helium/carbonyl gas stream flowed into lines 44 and 46. The helium/iron carbonyl gas mixture in line 46 and gaseous reactants supplied through line 40 were mixed at tee 48 before entering reactant feed tube 20. The gaseous reactants in line 40 were methane at 2500 cc/min, air at 2500 cc/min, and hydrogen sulfide at 5 cc/min.

Helium gas was used to avoid problems with oxidation and degradation of the carbonyl; however, other gases such as air and methane could be substituted under suitable conditions.

Microscopic carbon fibers were formed having a diameter in the range of 50 to 100 nanometers and a length of several micrometers with a density of about 0.003 g/cc. A yield of about 26 percent was obtained and there was relatively little soot admixture.

In this example, iron pentacarbonyl was used as a source of iron to form nuclei. The gaseous iron pentacarbonyl simplified the process of forming carbon fibers because volatilizing of liquid feedstock reactants, such as ferrocene, is not required.

TABLE 1

| Example # | ID of Feed Tube | Type of Feed Tube |
|---|---|---|
| 4 | 19 mm | Mullite |
| 4 | 19 mm | Mullite |
| 5 | 8 mm | Quartz |
| 6 | 22 mm | Stainless Steel |

| Flow Rate (cc/min) | Yield | Product Density (grams/cc) |
|---|---|---|
| 10,000 | 36% | 0.009 |
| 1,800 | 19% | 0.002 |
| 5,000 | 36% | 0.004 |

TABLE 1-continued

| 7,000 | 28% | 0.002 |

NOTE: All results are for a 13 centimeter ID reaction chamber.

COMPARATIVE EXAMPLE

For comparative purposes, the apparatus 10 of Example 3 was used in a process as described therein except that the feed tube 20 was only extended about 13 cm into the reactor chamber 14. In this position, the feed tube 20 was spaced about 88 cm from the reactor closed end 16. A colloidal, black soot-like product was obtained with a density of 0.05 grams per cubic centimeter. This product was 10 times as dense as that of Example 3 and only contained a few fibers.

As shown in Table I, three different feed tubes 20 were used: a 22 mm ID 304 stainless steel tube, a 19 mm ID mullite tube, and an 8 mm ID (quartz) silica tube.

The 304 stainless steel tube had sufficient heat capacity that evaporation of the liquid solution was accomplished effectively. However, it was not a completely satisfactory material as it corroded too rapidly.

The 8 mm silica tube has a low conductivity and a specific heat; therefore, any hexane flow above saturation rapidly cooled this tube and resulted in the formation of soot.

Mullite was preferred because it is more resistant to corrosion than stainless steel and it has better heat transfer properties than quartz. Mullite is also resistant to thermal shock which occurs when the liquid is injected.

Although not wishing to be limited to any particular theory, we believe the following is the theoretical explanation of fiber formation in apparatus 10. Microscopic fibers are formed from metal nuclei, preferably of iron having a diameter of about 5 nm. This is believed to be the optimum nucleus size for growing fibers. Ferrocene decomposes and nucleates into Fe particles in the feed tube 20. In the carbon-rich environment within the reactor 12, it is likely that carbon filaments (fiber precursors) lengthen for a relatively short time before each nucleus is surrounded by excess carbon products. Filament lengthening is not appreciable in the feed tube 20 because the tube may become blocked. The lengthening period is always, of course, less than the period of time each nucleus spends in the reactor 12. Once the filaments reach the larger diameter chamber 14, their linear flow (velocity) slows down and the filaments may lengthen and thicken for a relatively longer period of time, forming fibers in chamber 14 before they reach the outlet 18. As the filaments thicken, they move downward in the larger diameter chamber 14 so their motion will be assisted by gravity. As the fibers and accompanying gases leave the furnace 34, they cool as they flow downward, avoiding convective currents which would occur if the fibers exited at the top. Therefore, the apparatus 10 is constructed and arranged so that convection is minimized by suspending hot gases over cold. This is an important advantage which is only achieved by the apparatus 10 of this invention.

Accordingly, it is believed that a key factor in improving fiber growth is the construction and arrangement of the feed tube 20 and reactor chamber 14, which provides conditions conducive for fiber growth, particularly when liquid reactants, such as the hexane/ferrocene solution, are used. Hexane is suitable for this process because it has a relatively low heat of vaporization, which means cooling adjacent the inlet 22 of feed tube 20 is minimized.

The optimum flow of the hexane/ferrocene liquid solution is believed to be about 4.5 cubic centimeters per minute in the apparatus 10 as described in Example 4, with a ferrocene concentration in the solution greater than 0.6 grams for every 100 cubic centimeters of hexane. At that flow rate, the hexane was effectively dispersed in the mixture of gases which includes 2000 cubic centimeters per minute of air, 2500 cubic centimeters per minute of methane, and 9 cubic centimeters per minute of hydrogen sulfide. Under these conditions, the hexane had a partial pressure of 112 T, which is very close to its vapor pressure at 21° C. 111 T. Under these conditions, the heat transferred from the feed tube 20 to the flowing gases was small enough so that the gas temperature within the feed tube 20 remained near room temperature. Also, under these conditions, the mixture of reactants was lean enough in carbon so that formation of soot was avoided.

Below 1000° C., dense sooty material was produced. Over 1050° C., the desired low density microscopic fiber material were produced. The apparatus 10 could not be operated at a hot enough temperature to define a maximum temperature of fiber growth. Generally, as the temperature increased, there was an increase in the efficiency of conversion of the reactants to carbon products; that is, the yield of fibers increased with increasing temperature.

Other conditions which contributed to the formation of acceptable fibers included providing a quantity of sulfur, by weight which is approximately equal to the quantity of iron nuclei, and providing oxygen in the feed stream. Oxygen is known to preferentially attack the aromatics formed during pyrolysis, which are the precursors of soot. Thus, the oxygen acts to diminish soot formation. It should be noted that insufficient oxygen for complete combustion was provided. However, even partial oxidation of the incoming hydrocarbons diminished the soot produced compared to what would have existed in the absence of oxygen. Acceptable carbon fiber products are not formed when a stoichiometric amount of oxygen is introduced, and preferably no more than a fraction of the stoichiometric amount should be used.

The quality of fiber product may be roughly assessed by measuring its apparent density. This parameter is very useful for monitoring and optimizing fiber production in apparatus of the invention. For example, the apparent density of soot produced with no nuclei material present was well over 0.04 grams per cubic centimeter. Fibrous material, however, is much less dense, that is, near 0.002 grams per cubic centimeter. Thus, density measurements are useful for discriminating between microscopic fibers and soot. Low densities always correlated with high quality fibers. This was verified by beginning the process as described in Example 4 above with no ferrocene, and progressively adding ferrocene until the density dropped to about 0.002 grams per cubic centimeter. Adding more than 0.5 grams of ferrocene per 100 cubic centimeters of hexane did not further improve the density. Densities of fibers produced under the optimized conditions presented in Example 4 are included in Table I.

The apparatus 10 of the invention provided for continuous growth of carbon fibers while minimizing thermophoretic and convective losses. That is, the apparatus 10 of the invention minimizes the loss of heat and particularly the loss of the ability of the reactants to undergo reaction due to the loss of heat. The apparatus 10 maximized production of microscopic carbon fibers, and minimized the production of soot and fibers of undesirable dimensions.

While this invention has been described in terms of certain embodiments thereof, it is not intended that it be limited to the above description but rather only to the extent set forth in the following claims.

The embodiments of the invention in which an exclusive property or privilege is claimed are defined as follows:

1. An apparatus for forming carbon fibers by a continuous gas phase process comprising reaction of a gaseous carbonaceous compound in the presence of nuclei entrained in a gas stream, said apparatus comprising:
   (a) a reactor defining a reaction chamber having a vertical axis, a closed upper end and a lower outlet,
   (b) a reactant feed tube having an opening spaced from the reactor closed end, said feed tube extending generally axially upwardly within the reactor, whereupon said feed tube and said reactor cooperate to define a gas flow path that extends generally axially upward through the feed tube into the chamber and thereafter generally axially downward through the chamber,
   (c) means for heating the reactor to establish a hot zone within the reaction chamber adjacent the closed end thereof at a temperature sufficient to sustain carbon fiber growth and a relatively cool zone adjacent the reactor outlet, thereby establishing a thermal gradient within the reactor that minimizes convective currents therewithin,
   (d) means for continuously supplying a gaseous reactant stream comprising nuclei into the feed tube at a rate sufficient to entrain the nuclei within the gas stream for dispersion into the reactor hot zone, said reactor chamber having an average cross sectional area greater than said feed tube to accommodate said gas stream at a reduced downward flow rate suitable for sustained fiber growth, and
   (e) means for collecting carbon fibers from exhaust gas exiting the reactor outlet.

2. An apparatus according to claim 1 including said reactor chamber being tubular and substantially concentric with said opening, said reactor chamber having a diameter which is at least three times greater than the diameter of said opening.

3. An apparatus according to claim 1 wherein said feed tube extends at least three-fourths of the axial length of said reactor.

4. An apparatus for forming carbon fibers by a continuous gas phase process comprising thermal decomposition of a gaseous hydrocarbon compound in the presence of metal nuclei entrained in a gas stream, said apparatus comprising:
   (a) a tubular thermal reactor defining a thermal decomposition chamber having a vertical axis, a closed upper end and a lower outlet,
   (b) a reactant feed tube having an opening adjacent to and spaced from the reactor closed end, said feed tube extending axially upwardly within the reactor and radially spaced therefrom, whereupon said feed tube and said reactor cooperate to define a gas flow path that extends axially upward through the feed tube into the reactor chamber adjacent the reactor closed end and thereafter axially downward through the chamber about the feed tube,
   (c) means for heating the reactor to establish a hot zone within the chamber adjacent the closed end at a temperature sufficient to sustain carbon fiber growth and a relatively cool zone adjacent the reactor outlet, thereby establishing a thermal gradient within the reactor that minimizes convective currents within the reactor chamber and feed tube,
   (d) means for continuously supplying a gaseous reactant stream comprising a metal compound thermally decomposable to produce submicron metal nuclei into the feed tube at a rate sufficient to entrain the nascent metal nuclei within the gas stream for dispersion into the reactor hot zone, said reactor chamber having a cross sectional area substantially greater than the cross sectional area of said feed tube to accommodate said gas stream at a reduced downward flow rate suitable for sustained fiber growth, and
   (e) means for collecting carbon fibers from exhaust gas exiting the reactor outlet.

5. An apparatus according to claim 4 wherein said reactor chamber is tubular and generally concentric with said tube along the axial extent thereof and has a diameter which is at least three times greater than the diameter of said tube.

6. An apparatus according to claim 4 wherein said feed tube extends at least three-fourths of the axial length of said reactor.

7. An apparatus according to claim 4 with a capillary tube which has a discharge end within the feed tube and is concentric therewith.

8. An apparatus according to claim 4 wherein said reactor and feed tube are of mullite.

9. An apparatus for forming carbon fibers by a continuous gas phase process comprising pyrolytic decomposition of a gaseous hydrocarbon compound in the presence of iron nuclei entrained in a gas stream, said apparatus comprising:
   (a) an axially elongate tubular thermal reactor defining a hydrocarbon pyrolysis chamber having a closed upper end and a lower outlet,
   (b) an axially elongate reactant feed tube having an inlet and an opening adjacent the reactor closed end, said feed tube extending axially upwardly within the reactor at least three-fourths of the axial length of the reactor and radially spaced therefrom, whereupon said feed tube and said reactor cooperate to define a gas flow path extending axially upward through the feed tube into the reactor chamber adjacent the reactor closed end and thereafter extending axially downward through the chamber about the feed tube,
   (c) means for heating the reactor to establish a hot zone within the chamber adjacent the closed end at a temperature sufficient to sustain carbon fiber growth and a relatively cool zone adjacent the reactor outlet, thereby providing a first temperature adjacent said inlet, a second temperature greater than said first temperature within said hot zone and a third temperature less than said second temperature adjacent said outlet to minimize convective currents within the reactor chamber and feed tube,
   (d) means for continuously supplying a gaseous reactant stream comprising an iron compound thermally decomposable to produce submicron iron nuclei into the feed tube at a rate sufficient to entrain the nascent iron nuclei within the gas stream for dispersion into the reactor hot zone, said reactor chamber being generally concentric with said feed tube along the axial extent thereof and having a diameter at least three times greater than said feed tube to accommodate said gas stream at a reduced downward flow rate suitable for sustained fiber growth, and (e) means for collecting carbon fibers from exhaust gas exiting the reactor outlet.

* * * * *